(12) United States Patent
Aghajanyan et al.

(10) Patent No.: US 11,580,084 B2
(45) Date of Patent: Feb. 14, 2023

(54) HIGH PERFORMANCE DICTIONARY FOR MANAGED ENVIRONMENT

(71) Applicant: MICROSOFT TECHNOLOGY LICENSING, LLC, Redmond, WA (US)

(72) Inventors: Suren Aghajanyan, Bellevue, WA (US); Wenjiao Qi, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 278 days.

(21) Appl. No.: 15/630,360

(22) Filed: Jun. 22, 2017

(65) Prior Publication Data

US 2018/0373718 A1    Dec. 27, 2018

(51) Int. Cl.
*G06F 16/21* (2019.01)
*G06F 16/22* (2019.01)
*G06F 16/901* (2019.01)

(52) U.S. Cl.
CPC .......... *G06F 16/2255* (2019.01); *G06F 16/22* (2019.01); *G06F 16/2228* (2019.01); *G06F 16/2272* (2019.01); *G06F 16/2282* (2019.01); *G06F 16/9014* (2019.01); *G06F 16/21* (2019.01)

(58) Field of Classification Search
CPC ...... G06F 16/22; G06F 17/30; G06F 16/2255; G06F 16/2282; G06F 16/9014; G06F 16/2228; G06F 16/2272; G06F 16/21
USPC ........................................................ 707/752
See application file for complete search history.

(56) References Cited

U.S. PATENT DOCUMENTS

| 7,321,909 | B1 | 1/2008 | Garthwaite |
| 8,244,775 | B1 | 8/2012 | Bak et al. |
| 8,601,036 | B2 | 12/2013 | Nalla et al. |

(Continued)

FOREIGN PATENT DOCUMENTS

| EP | 0381418 A2 | 8/1990 | |
| EP | 0381418 A2 * | 1/2009 | ............ G06F 15/411 |

OTHER PUBLICATIONS

"Hash Table", Retrieved From: https://web.archive.org/web/20170429175154/https://en.wikipedia.org/wiki/Hash_table, Apr. 29, 2017, 18 Pages.

(Continued)

*Primary Examiner* — Hosain T Alam
*Assistant Examiner* — Tracy M McGhee
(74) *Attorney, Agent, or Firm* — Shook, Hardy & Bacon L.L.P.

(57) ABSTRACT

Systems and methods are provided for optimizing data structures to improve the data retrieval through the use of bucketing techniques. A number of objects within an environment is drastically reduced utilizing bucketing techniques. Within the buckets, items are sequentially organized such that location is quicker. Items, or keys, are aligned with the same hash value together in a bucket and a mapping of the hash value to the offset of the first key occurrence in that bucket. This guarantees each lookup operation is only two random read accesses. Systems and methods provided herein control the pressures on a system for garbage collection and minimize memory usage with minimal impacts on performance.

20 Claims, 6 Drawing Sheets

(56) References Cited

U.S. PATENT DOCUMENTS

| | | | |
|---|---|---|---|
| 8,701,095 B2 | 4/2014 | Stephens | |
| 8,856,186 B1 | 10/2014 | Li et al. | |
| 2002/0165994 A1 | 11/2002 | Chappell | |
| 2009/0019221 A1 | 1/2009 | Kessler | |
| 2010/0011357 A1 | 1/2010 | Ramamurthy | |
| 2012/0124106 A1 | 5/2012 | Allen et al. | |
| 2014/0040327 A1 | 2/2014 | Onodera et al. | |
| 2015/0067286 A1* | 3/2015 | Colgrove | G06F 3/0641 711/162 |
| 2015/0213114 A1 | 7/2015 | Bordawekar et al. | |
| 2016/0026392 A1* | 1/2016 | Harris | G06F 12/023 711/171 |
| 2016/0378750 A1* | 12/2016 | Legler | G06F 16/2255 707/747 |
| 2017/0161397 A1 | 6/2017 | Choi et al. | |

OTHER PUBLICATIONS

"International Search Report & Written Opinion for PCT Application No. PCT/US18/039109", dated Oct. 23, 2018, 12 Pages.

"Java Memory Management", https://www.dynatrace.com/resources/ebooks/javabook/how-garbage-collection-works/, Retrieved on: Nov. 9, 2016, 7 pages.

"Office Action Issued in European Patent Application No. 18740980.0", dated Aug. 19, 2021, 8 Pages.

"Summons to Attend Oral Proceedings Issued in European Patent Application No. 18740980.0", dated Sep. 21, 2022, 8 Pages.

\* cited by examiner

HIGH PERFORMANCE DICTIONARY FOR MANAGED ENVIRONMENT

BACKGROUND

Managed environments are typically subject to exorbitant amounts of data storage. Dictionaries, in particular, for managed environments, include an incredibly large amount of information for retrieval. For instance, typical dictionaries include millions of objects (e.g., for each item within the dictionary) for retrieval. Due to the large amount of items stored, a large stress is placed on the system with respect to garbage collection in that there is a tremendous amount of data to remove. Additionally, some of the collection may be unnecessary as the garbage collection is not aware of items that may not need to be removed and, thus, unnecessarily removes a very large number of items. This results in system performance reductions as a tremendous amount of effort and processing goes into garbage collection. Additionally, the excessive amounts of data is inefficient as related to data storage. Furthermore, the system expends a vast amount of resources on retrieval due to the sheer volume of objects stored. This results in stress on the system, decreased system performance, long latency, etc. There is a fine balance to be achieved to avoid taxing the garbage collection without sacrificing performance.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein is directed towards systems and methods for dictionary optimization for fast value retrieval based on keys in a large dataset. In particular, aspects of the technology described herein reduce the total number of objects within a data structure and optimize organization within the data structure to increase performance. In this way, large amounts of data may be stored efficiently in a single or a few objects, rather than the millions of object previously required, thus minimizing space requirements and reducing memory costs.

In one aspect, an optimized data structure for storing key-value datasets is provided. Large sets of data are stored onto a server. According to aspects of the technology described herein, those sets of data are turned into optimized data structures through the implementation of sequential bucketing techniques. Accordingly, as will be further described, the systems and methods of the technology described herein efficiently organize key-value datasets sequentially into buckets.

As will be further described, data storage consists of values of data indexed by keys that can be used to find and retrieve those values. In conjunction with the optimized data structure, read requests can be sent from front-end services or user devices, and maintain very fast and accurate data lookup and retrieval operations resulting in substantially reduced disk seeks and shortened read latency. In one aspect, only two hash operations and a single disk seek is required to retrieve data.

Additional objects, advantages, and novel features of the technology described herein will be set forth in part in the description which follows, and in part will become apparent to those skilled in the art upon examination of the following, or may be learned by practice of the technology described herein.

BRIEF DESCRIPTION OF THE DRAWINGS

Aspects of the technology described in the present application are described in detail below with reference to the attached drawing figures, wherein.

DETAILED DESCRIPTION

Figure 1:
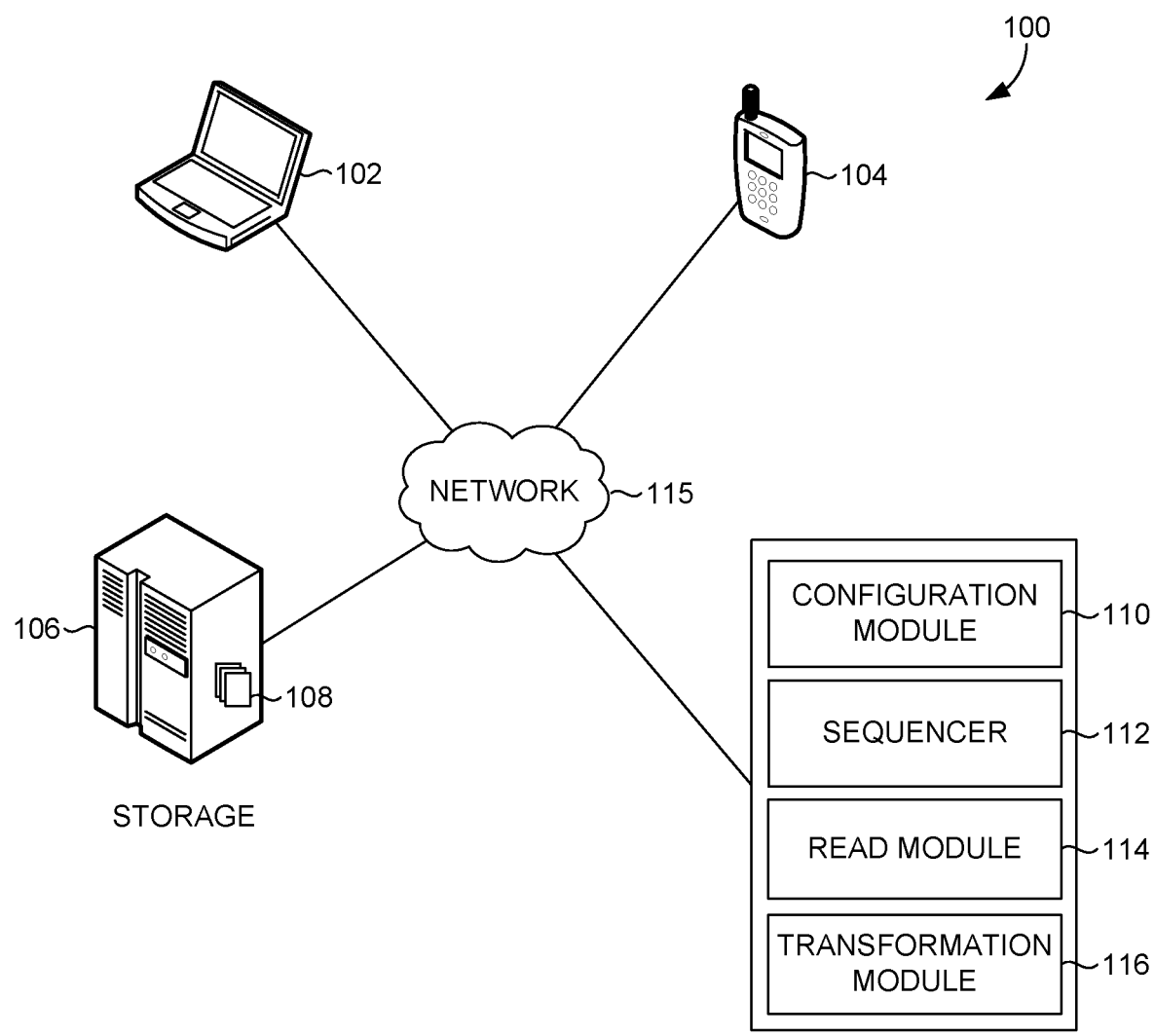
FIG. 1 is a block diagram of an example system architecture suitable for implementing aspects of the technology described herein.

The technology of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, creating optimized data structures for efficient storage of data. In aspects of the technology described herein, key-value dictionaries can be designed and optimized specifically for extremely fast retrieval. Data storage can consist of values of data indexed by one or more keys that can be used for finding and extracting those values in a managed environment. In order to reduce or minimize system latency and to reduce space requirements, data can be stored in continuous memory. In order to minimize response times in network services and improve the capacity of data centers, fast retrieval of the stored data is important. As such, where many data centers store large amounts of data, for example, in large distributed file-based caching systems, aspects of the present technology allow high-speed location and retrieval of data values due to the sequential organization of data and transformations thereof, including data-specific compression. Accordingly, space requirements and memory costs may be reduced or minimized for the storage of data and the location and retrieval of the stored data can be maximized for efficiency and speed.

As used herein, the term "bucket" or "bucketing" refers to a technique for decomposing datasets and creating data structures within databases or servers to store information. Values within datasets can be hashed and then stored into buckets. Buckets can be fixed so they do not fluctuate with the data and data can be placed into distinct buckets as files. Hashing algorithms can be used to generate a range of buckets (e.g., 1 to N) and, based on the results of the hashing, data is placed into particular buckets as a file.

The goal of the bucketing process is to find an optimal group of buckets for the particular dataset to be stored. The data may be organized into buckets based on user patterns for size, performance, or both. Each bucket may be designed with a plurality of data slots to store key-value pairs in a sequential order.

Accordingly, at a high level, a key-value storage database or dictionary for fast retrieval in a managed environment can be implemented. The data storage consists of data values indexed by a key that is used for finding and extracting those data values. In the context of a distributed file caching system (DFCS), a typical DFCS file contains a collection of key-value pairs in addition to metadata associated with the file. Given a key, one goal of the system is to quickly retrieve the value associated with it. Read latency associated with value retrieval is impacted by the number of disk operations completed during the read process, for example, the seek time and latency associated with locating the correct track and sector during disk seek operations. Additionally, previous storage methods allowed items to randomly float in memory, making it extremely difficult and time-consuming to locate a value match. As such, sequential bucketing techniques are employed herein for storing a given dataset as a highly efficient or optimized stored data structure. Utilizing an efficient data structure, the number of objects created in memory is reduced and read operations to a data store, data server, or disk can also be optimized for speed and accuracy.

In one aspect, a method for creating an optimized data structure is provided. The method recites identifying a plurality of items to be organized within an object; dividing the plurality of items into two or more subsets of items based on hash values of each item of the plurality of items, wherein a first subset of items is associated with a first bucket in the object and a second subset of items is associated with a second bucket in the object; distributing the first subset of items within the first bucket in a first sequential order; distributing the second subset of items within the second bucket in a second sequential order; performing data-specific transformations on each item within the bucket of the object; and creating the optimized data structure including the object comprising the first bucket having a sequentially organized first subset of items and the second bucket having a sequentially organized second subset of items.

In another aspect, one or more computer-storage media having computer-executable instructions embodied thereon that, when executed by a computing system, cause the computing system to perform a method for creating an optimized data structure. The method comprises identifying a plurality of items to be organized within an object; dividing the plurality of items into two or more subsets of items based on hash values of each item of the plurality of items, wherein a first subset of items is associated with a first bucket in the object and a second subset of items is associated with a second bucket in the object; distributing the first subset of items within the first bucket in a first sequential order; distributing the second subset of items within the second bucket in a second sequential order; performing transformations on each item within the bucket of the object; and creating the optimized data structure including the object comprising the first bucket having a sequentially organized first subset of items and the second bucket having a sequentially organized second subset of items.

In another aspect, a computer system comprising one or more processors; and one or more computer-storage media storing computer-executable instructions that, when executed by the one or more processors, are configured to implement a method. The method comprises identifying a plurality of items to be organized within an object; dividing the plurality of items into two or more subsets of items based on hash values of each item of the plurality of items, wherein a first subset of items is associated with a first bucket in the object and a second subset of items is associated with a second bucket in the object; distributing the first subset of items within the first bucket in a first sequential order; distributing the second subset of items within the second bucket in a second sequential order; performing transformations on each item within the bucket of the object; creating the optimized data structure including the object comprising the first bucket having a sequentially organized first subset of items and the second bucket having a sequentially organized second subset of items; receiving a request for a key-value lookup; identifying that a key-value pair of the key-value lookup is included in the first bucket; identifying a pointer associated with the first bucket, wherein the pointer is a bucket offset; locating the pointer within the object; sequentially scanning the first subset of items within the first bucket; and identifying a value of the key-value pair.

Having briefly described an overview of aspects of the technology described herein, an example operating environment suitable for use in implementing the technology is now described. With reference to FIG. 1, a block diagram is provided showing aspects of an example system architecture suitable for implementing an aspect of the technology described herein and designated generally as system 100. It should be understood that this and other arrangements described herein are set forth only as examples. Thus, system 100 represents only one example of a suitable computing system architecture. Other arrangements and elements (e.g., user devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, system 100 includes network 115 communicatively coupled to one or more user devices (e.g., items 102 and 104), storage 106, a configuration module 110, a sequencer 112, a read module 114, and a transformation module 116. The components shown in FIG. 1 may be implemented using one or more computing devices, such as computing device 500 described in connection to FIG. 5. Network 115 may include, without limitation, one or more local area networks (LANs) and/or wide area networks (WANs). Such networking environments are commonplace in offices, enterprise-wide computer networks, intranets, and the Internet. It should be understood that any number of user devices, storage components, and key-value system configuration models may be employed within the system 100 within the scope of the technology described herein. Each may comprise a single device or multiple devices cooperating in a distributed environment. For instance, sequencer 112 and transformation module 116 may be provided via multiple devices arranged in a distributed environment that collectively provide the functionality described herein. Additionally, other components not shown may also be included within the network environment.

Example system 100 includes user devices 102 and 104, which may comprise any type of user device capable of receiving input from a user. For example, in one aspect, user devices 102 and 104 may be the type of computing device described in relation to FIG. 5 herein. By way of example and not limitation, a user device may be embodied as a personal data assistant (PDA), a mobile device, a laptop, a tablet, remote control, entertainment system, vehicle computer system, embedded system controller, appliance, consumer electronic device, or other electronics device capable of receiving input from a user. The input may be received by one of many different modalities, such as, by way of example and not limitation, voice or sound, text, touch, click, gestures, the physical surroundings of the user, or other input technologies described in connection to FIG. 5. For instance, a user may utilize a search engine to input a query, intending to receive information highly relevant to the query. Or a user may use voice commands with a gaming system, television, etc. All of these forms of input, as well as others not specifically mentioned herein, are contemplated to be within the scope of the technology described herein. In some aspects, data input or data used by user devices 102 and 104 may be stored in storage 106.

Example user devices 102 and 104 are included in system 100 to provide an example environment wherein data stored by aspects of the technology described herein may be used by one or more user devices 102 and 104. It is also contemplated that some aspects of the technology described herein do not include user devices. For example, aspects of the technology may be practiced entirely on a server or in a data store. Further, although FIG. 1 shows two example user devices 102 and 104, a user may be associated with only one user device or more than two devices.

Storage 106 may store data files containing a dataset (i.e., a collection of key-value pairs). Metadata associated with those files may also be stored in storage 106. For example, files in a distributed file caching system may comprise key-value pairs, and, as such, given a key, values associated with that key may be retrieved. In an aspect, storage 106 comprises a data store, computer data memory, database, or disk. Further, although depicted as a single data store component, storage 106 may be embodied as one or more data stores or may be in the cloud. In some aspects, file data (or a dataset) is stored across a plurality of storage locations. In some aspects, storage 106 is configured to store read-only data, e.g., as DFCS data files.

Configuration module 110 may be used to create an optimized data structure for storing data. In particular, the optimized data structure may be part of a high-performance dictionary for a managed environment. Creation of the optimized data structure is achieved in aspects herein utilizing sequential bucketing techniques that creates an array structure or object having 1 to n buckets identified by an index. Each bucket may contain a collection of key-value pairs. The sequential bucketing may be performed offline.

Essentially, the configuration module 110 may identify a plurality of items (e.g., key-value pairs) to be organized within the dictionary. As previously stated, previous methods of organization (or lack thereof) would have randomly included objects for each key and each value that were floating in memory with no easy location mechanism.

The items may be organized into buckets by the configuration module 110 utilizing a variety of criteria. For example, user patterns may be used to divide the items into buckets. Alternatively, the items/data may be organized based on size, performance, or both. For instance, if organizing the buckets based on performance, there may be a larger jump table (e.g., a number of buckets) versus organizing by size may call for a fewer number of buckets. By way of another example, to optimize performance, items with the same hash value are aligned together within a bucket and a mapping of the hash value to the offset of the first key occurrence in that bucket is referenced during retrieval. When building the data structure, the dictionary may select the most optimal hash and placement algorithm. Regardless of how the data is initially organized into buckets, the data within the buckets is further organized into sequential order to provide more efficient storage and faster retrieval options.

The sequencer 112 is configured to organize the data within the buckets in sequential order. For instance, key-value pairs may be organized in sequence so that they are easier to locate. The sequence may be based on hash values, key values, etc. By way of example only, assume that key 2 is input and value 2 is the corresponding output. The bucket may be organized k1, v1, k2, v2. Thus, value 2 is quickly identified as it is sequentially following key 2, which may be identified using the offset of the first occurrence of key 2 in the bucket. As previously stated, the keys with the same hash values are aligned in the buckets and a mapping of the hash values to the offset of the first key occurrence in the bucket is stored. Thus, the mapping is referenced to identify the first time the key occurs in a bucket and that offset is utilized to quickly get to that location to retrieve the value associated with the key. This guarantees each lookup operation only costs two random read accesses. In other words, the bucketed objects are organized to include pointers/offsets for each bucket, for each key occurrence in a bucket, etc. Thus, each bucket is associated with one or more pointers/offsets that identify a location within the object for quicker retrieval by a read module 114.

The read module 114 can be configured to perform a read operation on the stored data. According to aspects of the technology described herein, the read module 114 can retrieve a value associated with a key from the data structure. In order to perform a read operation for a given key, the system determines which bucket that key resides in. Metadata may include as associated bucket number and/or a hash function that maps each key to a bucket within the object. A hash function, as used herein, refers generally to a function that identifies a bucket in which a key is found. It will be appreciated that any hash function may be used to create a key-value data structure incorporating the bucketing process and for performing read operations to the data structure to retrieve values. In some aspects of the technology described herein, a minimum perfect hash is used. The metadata may also include an offset to identify where a given buckets is located and/or locations within the bucket where keys and/or values may be found.

The transformation module 114 may further perform transformations on the data to ensure efficient storage. An exemplary transformation may include data-specific compression. The data would, consequently, be very compact and space efficient, which requires a fewer number of buckets to hold the data. An additional exemplary transformation may include conversion to a different filter (e.g., Bloom filter) to significantly reduce the size.

Thus, utilizing the above described technology, a number of objects may be reduced to one, two, or a few—substantially less than the millions previously encountered. This reduces the pressure on the system with respect to storage, garbage collection, processing performance, and the like.

Figure 2:
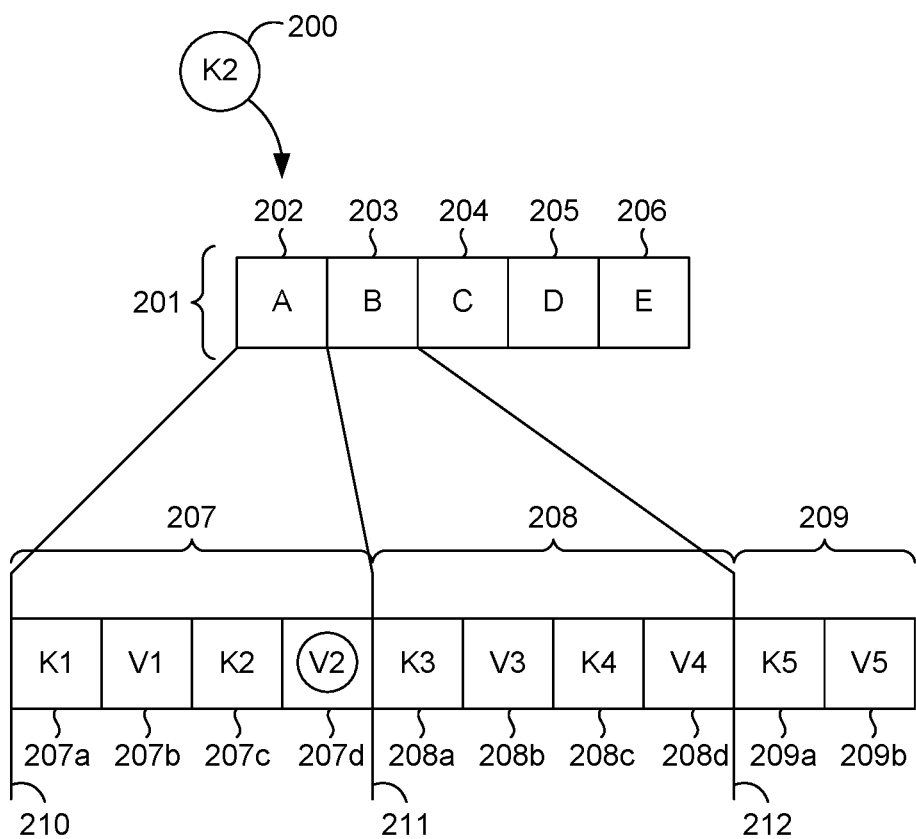
FIG. 2 is an exemplary system diagram showing a sequential bucketed data storage system suitable for implementing aspects of the technology described herein.

Turning to FIG. 2, a visualization of the bucketing aspect is provided. Initially, a plurality of items (e.g., records having key-value pairs) are identified. Data record 200 is shown for simplicity but there would be many data records encountered. These data records need to be stored in buckets such as buckets 202, 203, 204, 205, and 206. A plurality of buckets are compiled, each containing one or more data items, to create an object 201. Thus, a single object 201 includes a plurality of data items.

As with the data records, only three buckets are shown for the sake of simplicity. The first bucket (corresponding to bucket 202 or Bucket A shown in the object 201) includes data set 207 comprising data items 207a, 207b, 207c, and 207d. Similarly, the second bucket (corresponding to Bucket B or bucket 203) includes data set 208 comprising data items 208a, 208b, 208c, and 208d. Finally, the third bucket (corresponding to Bucket C or bucket 204) includes data set 209 comprising data items 209a and 209b. As noted above, each bucket may also include a pointer or offset indicating where the bucket begins or a pointer or offset for specific key occurrences within the bucket. Bucket 202, for instance, includes pointer 210 illustrating the beginning of bucket 202. Distinctly, bucket 203 is associated with pointer 211 indicating where bucket 203 begins. Finally, bucket 204 is associated with pointer 212 indicating where bucket 204 begins. A pointer (not shown) may also be located in data set 208 between V3 and K4 to indicate the first occurrence of K4.

FIG. 2 also illustrates that the data items within each bucket are sequentially ordered. For instance, bucket 202 is ordered k1, v1, k2, v2; bucket 203 is ordered k3, v3, k4, v4; and bucket 204 is ordered k5, v5. When sequentially ordered, the value of the key-value pair is closer to the key such that location of the value is faster by order of magnitude. For example, if the input 200 is K2, a pointer to identify a bucket comprising K2 or a pointer to identify the first occurrence of K2 is initially identified. Once that is identified, K2 is located and V2 would be the next sequential value; thus, keeping key-value pairs located near one another in sequential order.

Figure 3:
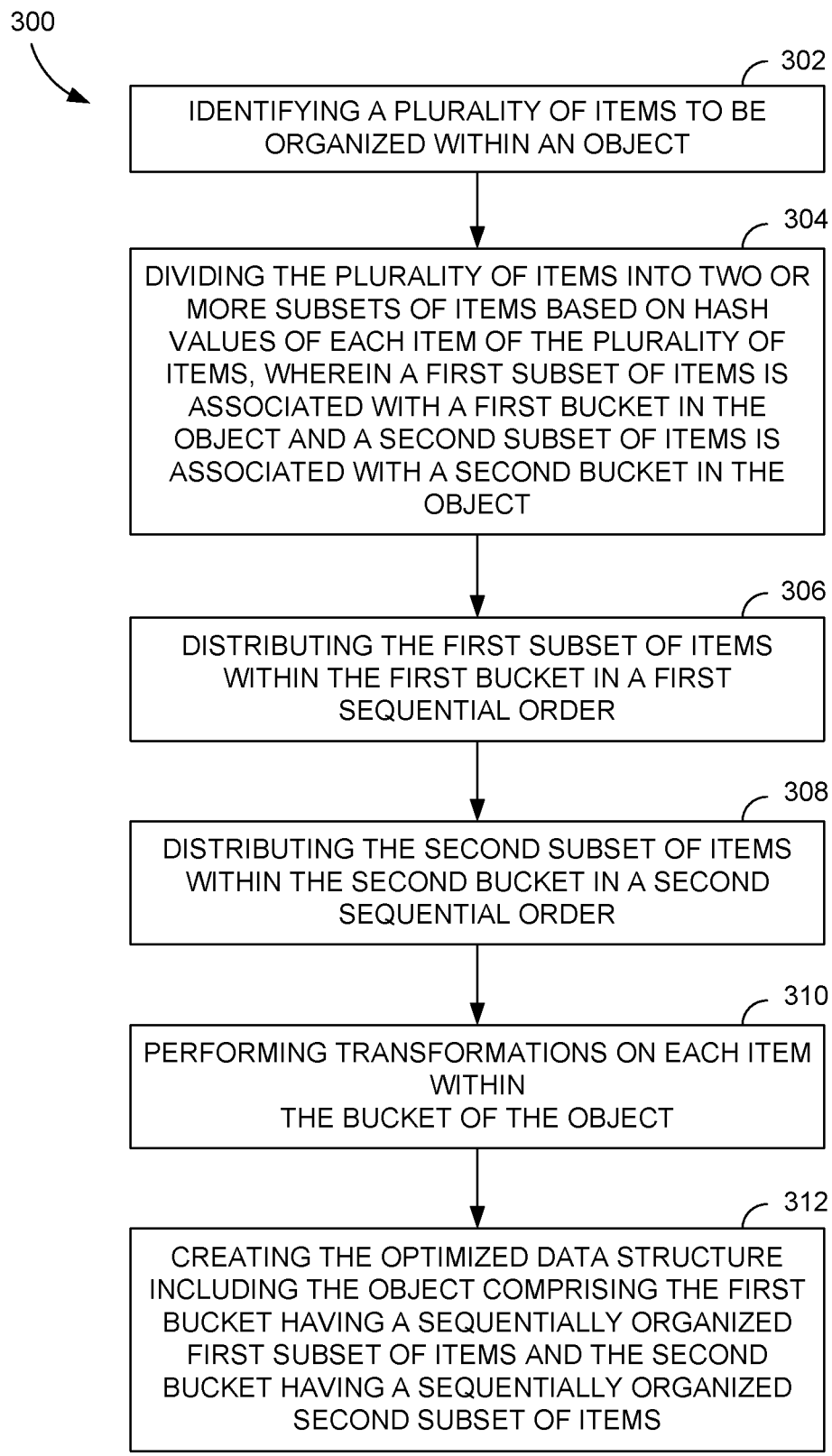
FIG. 3 depicts an exemplary flow diagram of a method for optimizing a data structure, in accordance with aspects of the present disclosure.

Turning to FIG. 3, a flow diagram is provided illustrating one exemplary method 300 for optimizing a data structure. The data structure produced according to method 300 is suitable for use in a managed environment. Initially, at step 302 a plurality of items to be organized within an object is identified, wherein the items include records having key-value pairs. At step 304, the plurality of items is divided into two or more subsets of items based on hash values of each item of the plurality of items, wherein a first subset of items is associated with a first bucket in the object and a second subset of items is associated with a second bucket in the object. At step 306, the first subset of items is distributed within the first bucket in a first sequential order and the second subset of items is distributed within the second bucket in a second sequential order at step 308. At step 310, transformations are performed on each item within the bucket of the object. At step 312, the optimized data structure is created including the object comprising the first bucket having a sequentially organized first subset of items and the second bucket having a sequentially organized second subset of items.

Figure 4:
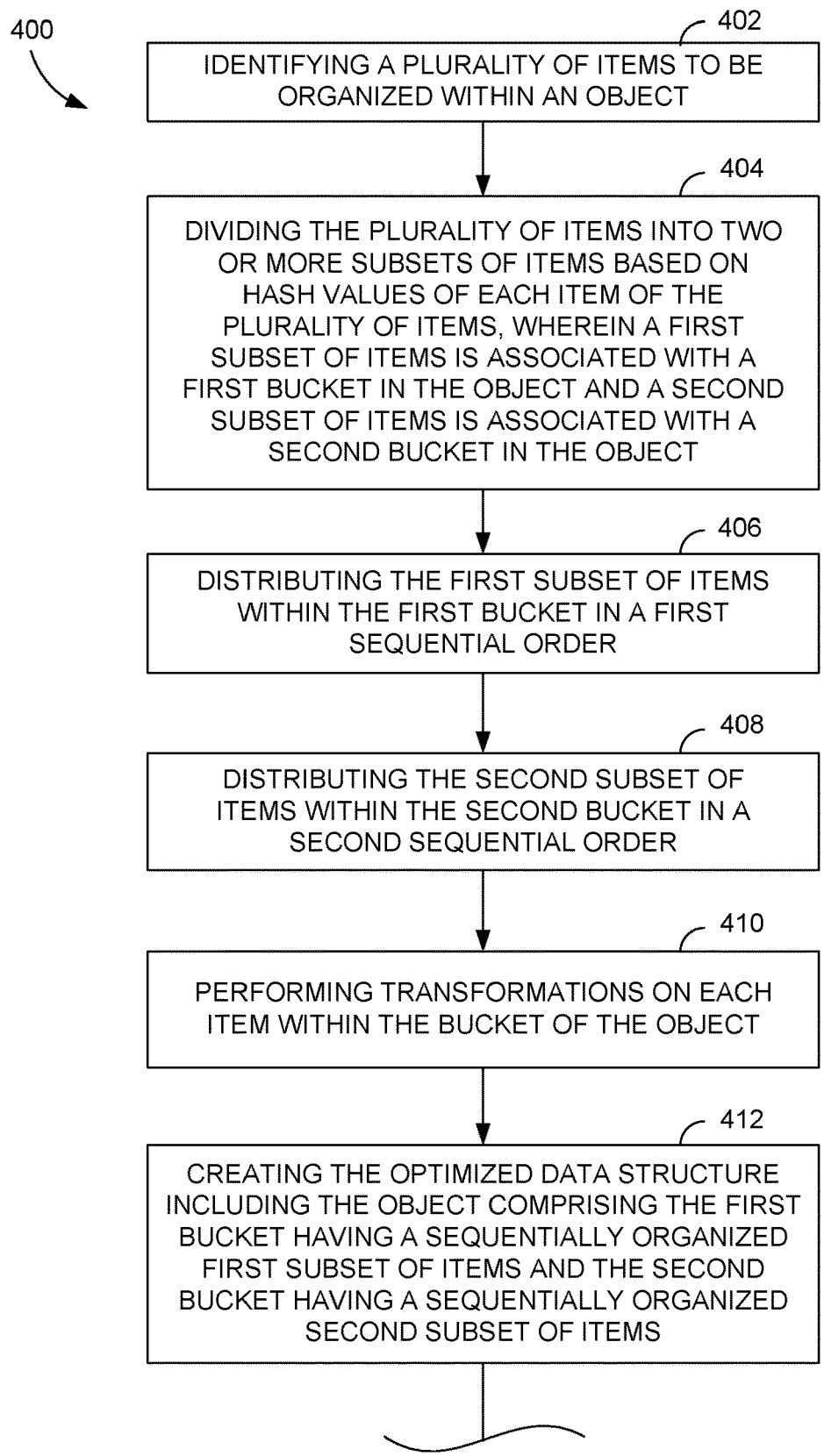
FIG. 4 depicts an exemplary flow diagram of a method for optimizing a data structure, in accordance with aspects of the present disclosure.
Figure 4:
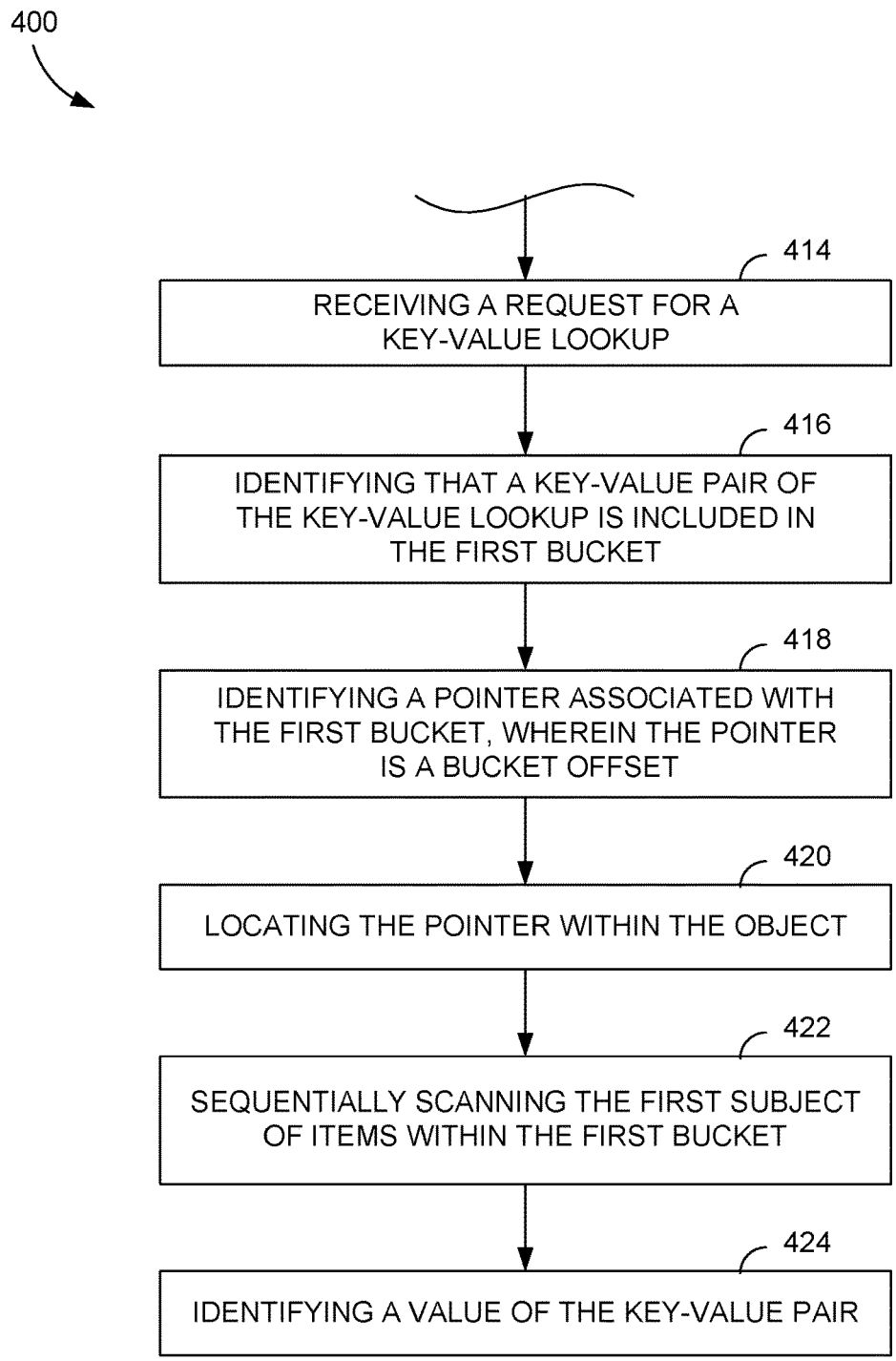

Turning to FIG. 4, a flow diagram is provided illustrating another method 400 for creating an optimized data structure, in accordance with implementations of the technology described herein. Initially, at step 402, a plurality of items to be organized within an object is identified. At step 404, the plurality of items is divided into two or more subsets of items based on hash values of each item of the plurality of items, wherein a first subset of items is associated with a first bucket in the object and a second subset of items is associated with a second bucket in the object. At step 406, the first subset of items is distributed within the first bucket in a first sequential order and at step 408 the second subset of items is distributed within the second bucket in a second sequential order. At step 410, transformations are performed on each item within the bucket of the object. At step 412, the optimized data structure is created including the object comprising the first bucket having a sequentially organized first subset of items and the second bucket having a sequentially organized second subset of items. At step 414, a request for a key-value lookup is received. At step 416, it is identified that a key-value pair of the key-value lookup is included in the first bucket. At step 418, a pointer associated with the first bucket is identified, wherein the pointer is a bucket offset. At step 420, the pointer is located within the object. At step 422, the first subset of items within the first bucket is sequentially scanned. At step 424, a value of the key-value pair is identified.

Figure 5:
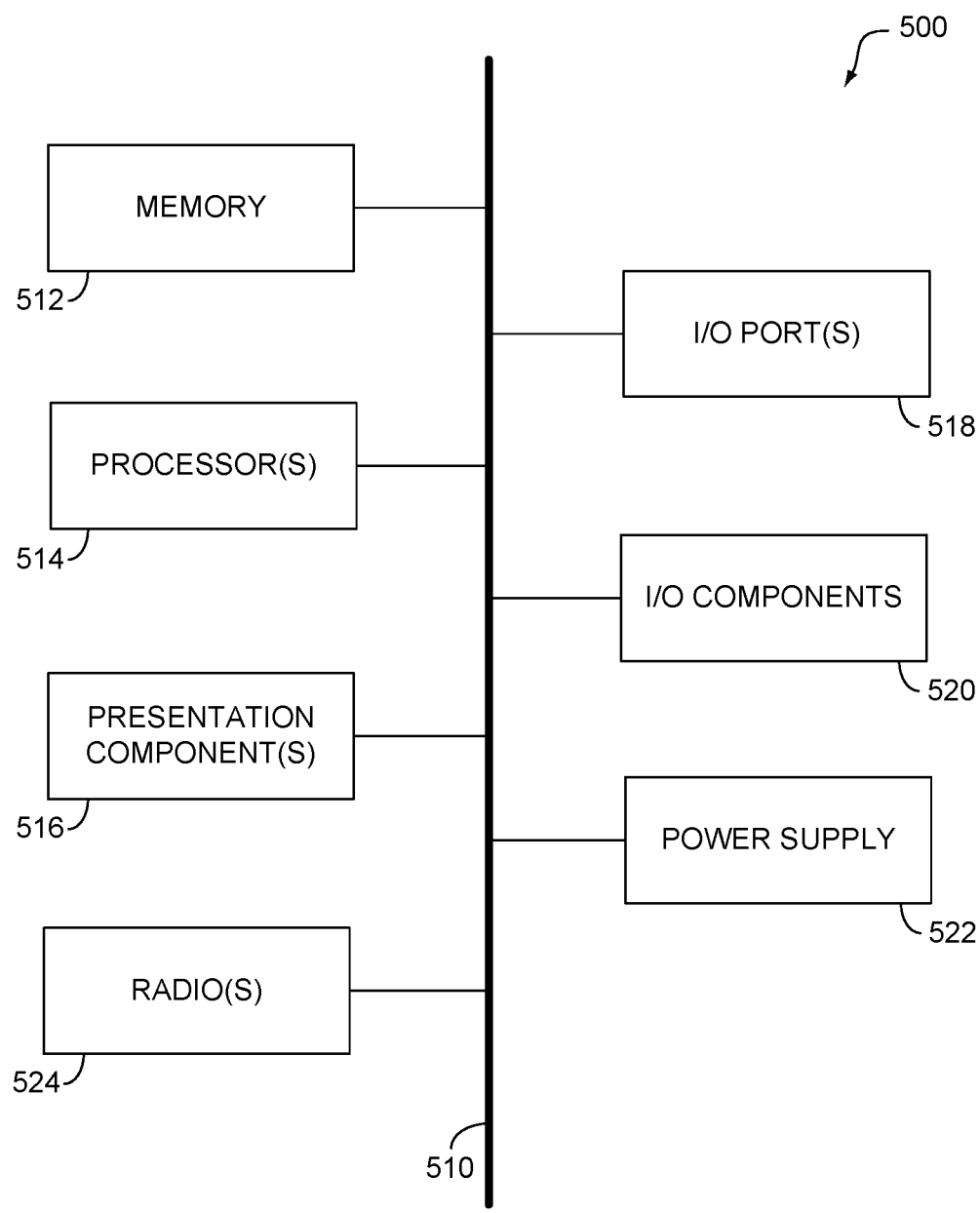
FIG. 5 is a block diagram of an exemplary computing environment suitable for implementing aspects of the technology described herein.

Having described various implementations, an exemplary computing environment suitable for implementing aspects of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of aspects of the disclosure. Neither should the computing device 500 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media.

Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. In some implementations, presentation components may be associated with user devices 102 and 104 of system 100 and may be embodied as a presentation component 516. Other examples of presentation components may include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some aspects of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for creating an optimized data structure in a computer memory, the method comprising:
    identifying a plurality of items to be organized within a plurality of buckets associated with an object in the computer memory, wherein the plurality of items are associated with corresponding key-value pairs, the key-value pairs are used to locate each of the plurality of items;
    dividing the plurality of items into two or more subsets of items based on hash values of each item of the plurality of items, wherein a first subset of items is associated with a first bucket and a second subset of items is associated with a second bucket, wherein a first hash value is associated with a bucket pointer of the first bucket, and wherein a second hash value is associated with a bucket offset of the first bucket, the bucket offset of the first bucket identifies a first occurrence in the first bucket of a key associated with the second hash value;

distributing the first subset of items within the first bucket in a first sequential order, wherein the first sequential order comprises a first key that is sequentially next to a first value associated with the first key;

distributing the second subset of items within the second bucket in a second sequential order, wherein the second sequential order comprises a second key sequentially next to a second value associated with the second key; and creating the optimized data structure including the object comprising the first bucket having a sequentially organized first subset of items and the second bucket having a sequentially organized second subset of items.

2. The method of claim 1, further comprising: performing transformations on each item within the buckets of the object; and scanning each item of the plurality of items to identify a type of data-specific transformation.

3. The method of claim 2, wherein the type of transformation is a bloom filter.

4. The method of claim 2, wherein the type of transformation is data-specific compression.

5. The method of claim 1, wherein a third hash value is associated with a bucket pointer corresponding to the second bucket.

6. The method of claim 1, wherein a fourth hash value is associated with a bucket offset of the second bucket, the bucket offset identifies a first occurrence of a key associated with the fourth hash value.

7. The method of claim 1, further comprising receiving a request for a key-value pair lookup.

8. The method of claim 7, further comprising identifying in which bucket the key-value pair is located based on hash values.

9. The method of claim 8, further comprising identifying a pointer associated with an identified bucket having the key-value pair, wherein the pointer indicates a location within the object where the bucket is located.

10. One or more computer-storage media having computer-executable instructions embodied thereon that, when executed by a computing system, cause the computing system to perform a method for creating an optimized data structure, the method comprising:

identifying a plurality of items to be organized within an object;

dividing the plurality of items into two or more subsets of items based on hash values of each item of the plurality of items, wherein a first subset of items is associated with a first bucket and a second subset of items is associated with a second bucket, wherein a first hash value is associated with a bucket pointer of the first bucket, and wherein a second hash value is associated with a bucket offset of the first bucket, the bucket offset of the first bucket identifies a first occurrence in the first bucket of a key associated with the second hash value;

distributing the first subset of items within the first bucket in a first sequential order, wherein the first sequential order comprises a first key that is sequentially next to a first value associated with the first key;

distributing the second subset of items within the second bucket in a second sequential order, wherein the second sequential order comprises a second key sequentially next to a second value associated with the second key; and creating the optimized data structure including the object comprising the first bucket having a sequentially organized first subset of items and the second bucket having a sequentially organized second subset of items.

11. The media of claim 10, wherein a third hash value is associated with a bucket pointer of the second bucket.

12. The media of claim 10, wherein a fourth hash value is associated with a bucket offset of the second bucket, the bucket offset of the second bucket identifies a first occurrence in the second bucket of a key associated with the fourth hash value.

13. The media of claim 12, further comprising: identifying in which bucket the key-value pair is located based on hash values, wherein items having a same hash value are aligned together within a bucket and a mapping of the hash value to an offset of a first key occurrence in that bucket is referenced during retrieval of a value.

14. The media of claim 13, further comprising: identifying the offset associated with an identified bucket having the key-value pair, wherein the offset indicates a location within the object where the identified bucket is located, and wherein aligning the items having the same hash value and referencing the mapping of the hash value guarantees that a lookup operation requires only two random read accesses.

15. A computer system comprising:
one or more processors; and
one or more computer-storage media storing computer-executable instructions that, when executed by the one or more processors, are configured to implement a method comprising:

identifying a plurality of items to be organized within an object;

dividing the plurality of items into two or more subsets of items based on hash values of each item of the plurality of items, wherein a first subset of items is associated with a first bucket and a second subset of items is associated with a second bucket, wherein a first hash value is associated with a bucket pointer of the first bucket, and wherein a second hash value is associated with a bucket offset of the first bucket, the bucket offset of the first bucket identifies a first occurrence in the first bucket of a key associated with the second hash value;

distributing the first subset of items within the first bucket in a first sequential order, wherein the first sequential order comprises a first key that is sequentially next to a first value associated with the first key;

distributing the second subset of items within the second bucket in a second sequential order, wherein the second sequential order comprises a second key sequentially next to a second value associated with the second key;

creating an optimized data structure including the object comprising the first bucket having a sequentially organized first subset of items and the second bucket having a sequentially organized second subset of items.

16. The system of claim 15, further comprising: performing transformations on each item within the buckets of the object; and scanning each item of the plurality of items to identify a type of data-specific transformation.

17. The system of claim 16, wherein the type of transformation is a bloom filter or a data-specific compression.

18. The system of claim 15, wherein a third hash value is associated with a bucket pointer of the second bucket.

19. The system of claim 15, wherein a fourth hash value is associated with a bucket offset of the second bucket, the bucket offset of the second bucket identifies a first occurrence in the second bucket of a key associated with the fourth hash value.

20. The system of claim 15, further comprising:
   receiving a request for a key-value lookup;
   identifying that a key-value pair of the key-value lookup is included in the first bucket
   identifying a pointer associated with the first bucket, wherein the pointer is a bucket offset
   locating the pointer within the object
   sequentially scanning the first subset of items within the first bucket
   identifying a value of the key-value pair; and
   returning the value of the key-value pair.

* * * * *